US010170805B2

(12) United States Patent
Kuboki et al.

(10) Patent No.: US 10,170,805 B2
(45) Date of Patent: Jan. 1, 2019

(54) ELECTRICITY STORAGE MODULE

(71) Applicants: AUTONETWORKS TECHNOLOGIES, LTD., Yokkaichi, Mie (JP); SUMITOMO WIRING SYSTEMS, LIMITED, Yokkaichi, Mie (JP); SUMITOMO ELECTRIC INDUSTRIES, LTD., Osaka-shi, Osaka (JP)

(72) Inventors: Hideyuki Kuboki, Yokkaichi (JP); Hiroki Hirai, Yokkaichi (JP); Tomoyuki Sakata, Yokkaichi (JP); Makoto Higashikozono, Yokkaichi (JP); Toshifumi Ichio, Yokkaichi (JP); Kenji Nakagawa, Yokkaichi (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 179 days.

(21) Appl. No.: 15/308,031

(22) PCT Filed: Apr. 28, 2015

(86) PCT No.: PCT/JP2015/062828
§ 371 (c)(1),
(2) Date: Oct. 31, 2016

(87) PCT Pub. No.: WO2015/170646
PCT Pub. Date: Nov. 12, 2015

(65) Prior Publication Data
US 2017/0062881 A1 Mar. 2, 2017

(30) Foreign Application Priority Data
May 7, 2014 (JP) .................................. 2014-095692

(51) Int. Cl.
*H01M 2/10* (2006.01)
*H01M 2/30* (2006.01)
(Continued)

(52) U.S. Cl.
CPC ............ *H01M 10/482* (2013.01); *H01G 2/04* (2013.01); *H01G 11/12* (2013.01); *H01G 11/16* (2013.01);
(Continued)

(58) Field of Classification Search
CPC .... H01M 2/1061; H01M 2/202; H01M 2/204; H01M 10/482; H01M 2/1077; H01M 2/206; H01M 2/30
See application file for complete search history.

(56) References Cited

U.S. PATENT DOCUMENTS

2005/0140338 A1    6/2005   Kim et al.
2005/0221177 A1   10/2005   Amagai et al.
(Continued)

FOREIGN PATENT DOCUMENTS

EP    3 104 467 A1   12/2016
GB    2330252 A     4/1999
(Continued)

OTHER PUBLICATIONS

Jun. 28, 2017 Search Report issued in European Patent Application No. 15789316.5.
(Continued)

*Primary Examiner* — Stewart A Fraser
(74) *Attorney, Agent, or Firm* — Oliff PLC

(57) ABSTRACT

An electricity storage module that includes a power storage element group obtained by stacking a plurality of power storage elements each having a lead terminal that protrudes from a side edge; and holding members that are attached to the side edges at which the lead terminals are provided and
(Continued)

that hold the power storage elements, the holding members being provided with a fuse mounting portion for mounting a fuse that is to be electrically connected to the lead terminal.

5 Claims, 21 Drawing Sheets

(51) Int. Cl.
*H01M 10/48* (2006.01)
*H01G 11/12* (2013.01)
*H01G 11/76* (2013.01)
*H01G 2/04* (2006.01)
*H01G 11/16* (2013.01)
*H01M 10/613* (2014.01)
*H01M 10/6551* (2014.01)
*H01M 2/34* (2006.01)
*H01G 11/82* (2013.01)
*H01G 2/16* (2006.01)

(52) U.S. Cl.
CPC .............. *H01G 11/76* (2013.01); *H01G 11/82* (2013.01); *H01M 2/10* (2013.01); *H01M 2/1061* (2013.01); *H01M 2/30* (2013.01); *H01M 2/34* (2013.01); *H01M 10/613* (2015.04); *H01M 10/6551* (2015.04); *H01G 2/16* (2013.01); *H01M 2200/00* (2013.01); *Y02E 60/13* (2013.01)

(56) References Cited

U.S. PATENT DOCUMENTS

| | | | |
|---|---|---|---|
| 2011/0248719 A1* | 10/2011 | Aoki | ............... H01M 10/482 |
| | | | 324/426 |
| 2014/0134464 A1 | 5/2014 | Jang et al. | |
| 2014/0322978 A1 | 10/2014 | Okamoto et al. | |
| 2017/0040583 A1* | 2/2017 | Kuboki | ............... H01G 11/12 |

FOREIGN PATENT DOCUMENTS

| | | |
|---|---|---|
| JP | 2005-285625 A | 10/2005 |
| JP | 2007-503690 A | 2/2007 |
| JP | 2008-204816 A | 9/2008 |
| JP | 2013-114956 A | 6/2013 |
| JP | 2014-078365 A | 5/2014 |
| JP | 2014-078371 A | 5/2014 |
| WO | 2005/060025 A1 | 6/2005 |
| WO | 2012/148209 A2 | 11/2012 |
| WO | 2013/069756 A1 | 5/2013 |
| WO | 2014/057755 A1 | 4/2014 |

OTHER PUBLICATIONS

Jun. 9, 2015 Search Report issued in International Patent Application No. PCT/JP2015/062828.

* cited by examiner

ELECTRICITY STORAGE MODULE

BACKGROUND

The present disclosure relates to an electricity storage module.

Detection terminals for detecting states of electric cells may be connected to a plurality of the electric cells constituting a battery module (see JP 2013-114956A, for example). Detection electric wires are connected to the detection terminals, and the detection electric wires are connected to a battery ECU, or the like.

SUMMARY

In the battery module of JP 2013-114956A, fuses that blow out when detection electric wires are shorted are connected to the detection electric wires. Because this battery module includes a resin protector for accommodating the detection electric wires, and a fuse block that is separate from the resin protector, there was a limit to a reduction in its size.

An exemplary aspect of the present disclosure provides a more compact electricity storage module including a fuse.

An exemplary aspect of the present disclosure is an electricity storage module including a power storage element group obtained by stacking a plurality of power storage elements each having a lead terminal that protrudes from a side edge, and holding members that are attached to the side edges at which the lead terminals are provided and that hold the power storage elements, the holding members being provided with a fuse mounting portion for mounting a fuse that is to be electrically connected to the lead terminal.

In the present disclosure, since the holding members for holding the power storage element are provided with the fuse mounting portion, no other member for mounting the fuse is required. As a result, according to the present disclosure, a more compact electricity storage module can be provided.

The present disclosure may have the following configurations.

Holding members that are adjacent in a direction in which the power storage elements are stacked may be locked movably in the direction in which the power storage elements are stacked.

With such a configuration, tolerances in the direction in which the power storage elements are stacked can be accommodated.

The holding members may be provided with a detection terminal holding portion for holding a detection terminal for detecting a state of the power storage element.

With such a configuration, the holding members provided with the fuse mounting portion can also hold the detection terminal, and thus a reduction in size of the electricity storage module can be reliably achieved.

According to the present disclosure, a more compact electricity storage module can be provided.

DETAILED DESCRIPTION OF EMBODIMENTS

Embodiment 1

Figure 1:
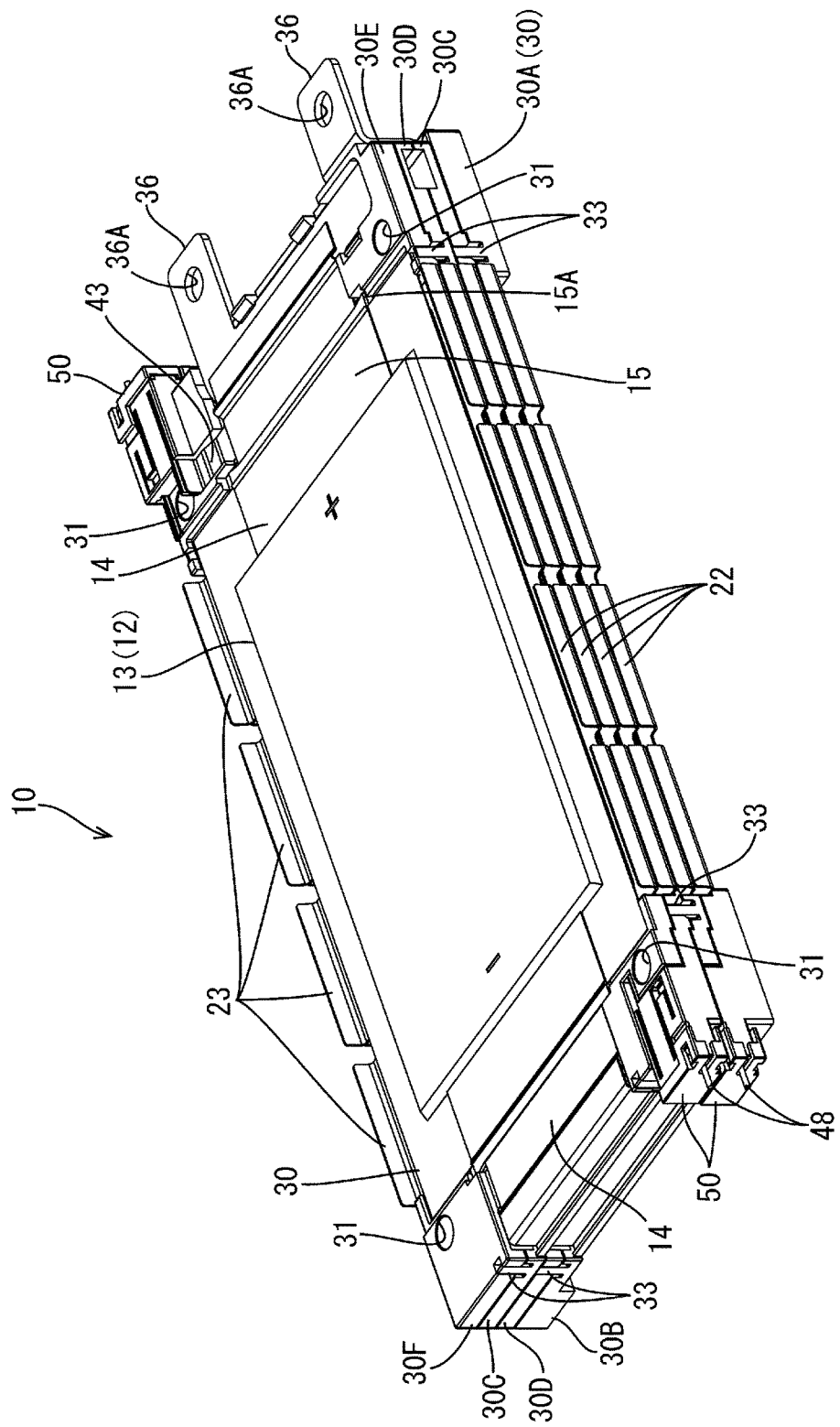
FIG. 1 is a perspective view of an electricity storage module of Embodiment 1 shown from the front side.

Embodiment 1 of the present disclosure will be described with reference to FIGS. 1 to 21. In the drawings, reference signs may be given to only one member of a plurality of the same members, and reference signs may be omitted from the other same members. In the following description, the terms front and back respectively refer to the left side and right side of FIG. 1.

Figure 2:
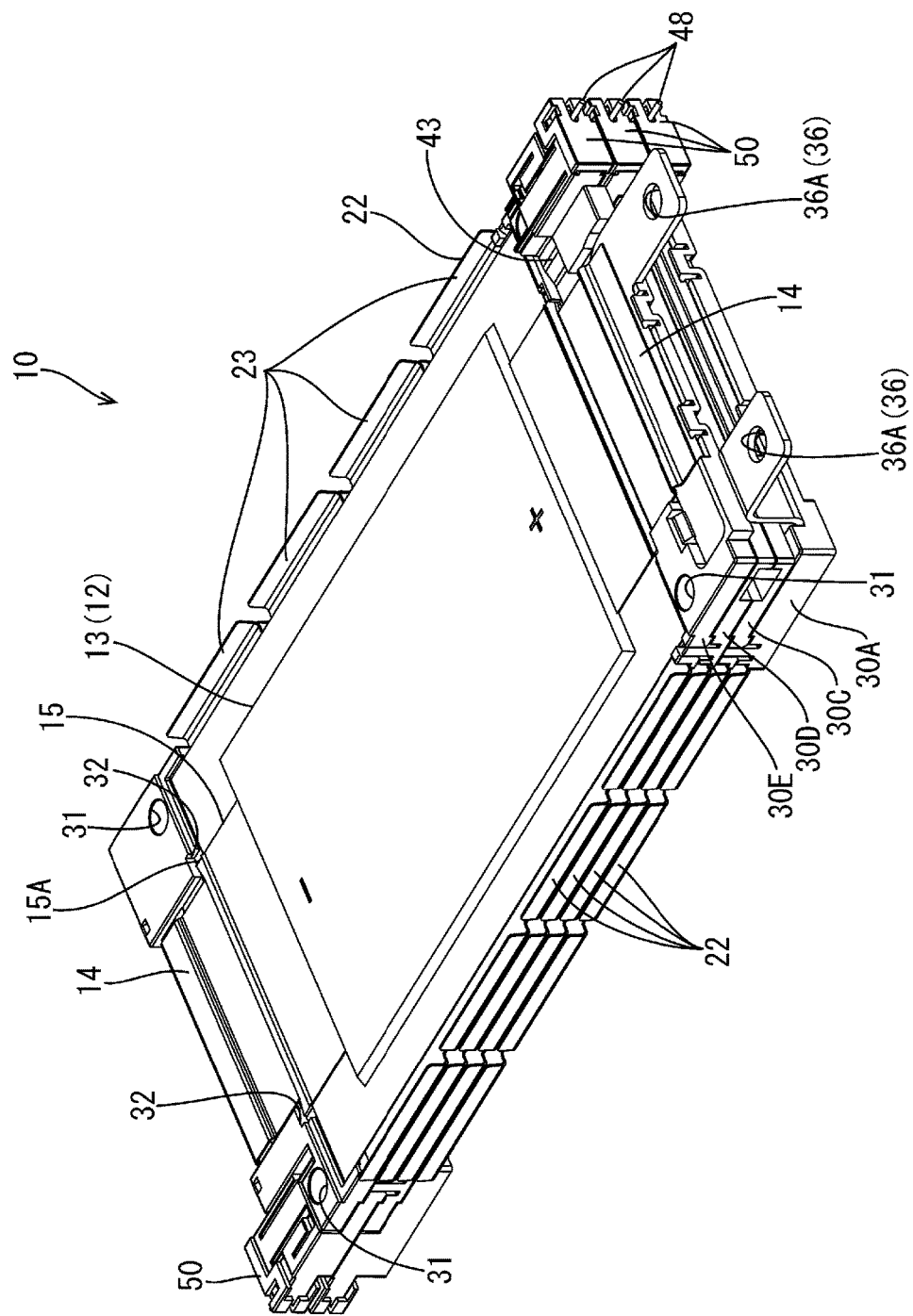
FIG. 2 is a perspective view of the electricity storage module from the rear side.

As shown in FIGS. 1 and 2, an electricity storage module 10 of the present embodiment includes a power storage element group 11 obtained by stacking a plurality of power storage elements 12 (four in the present embodiment). In the present embodiment, any power storage elements 12 such as secondary batteries, capacitors, and condensers can be used as the power storage elements 12 as needed. A secondary battery is used as the power storage element 12 according to the present embodiment.

The electricity storage module 10 of the present embodiment includes a stacked object 20 obtained by stacking four power storage units 21 each obtained by placing the power storage element 12 on a heat transfer member 22 to which a holding member 30 is attached.

Power Storage Unit 21

Figure 4:
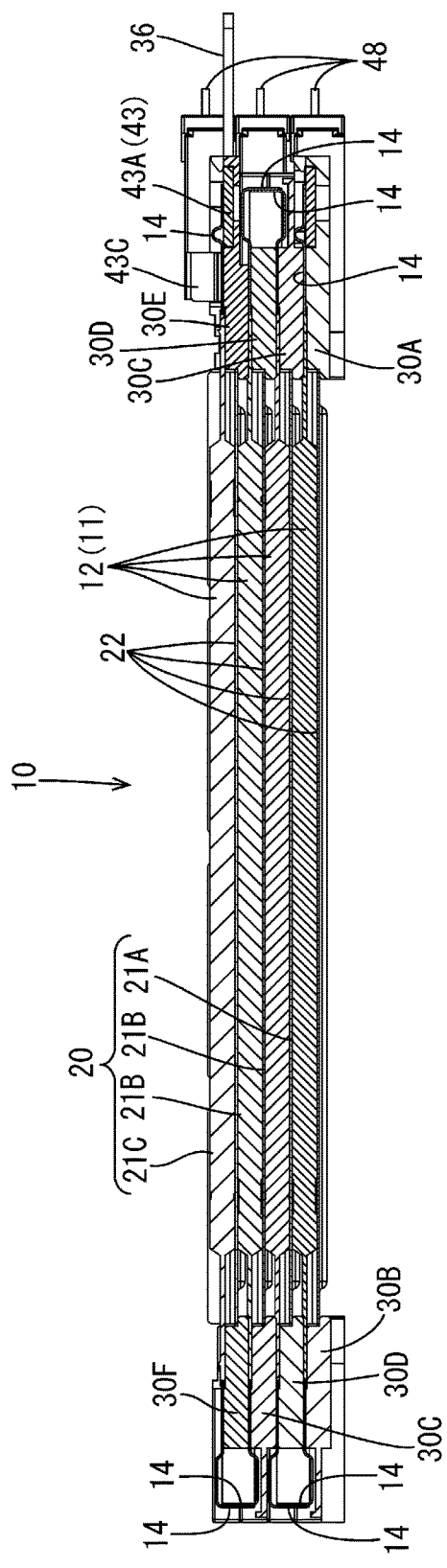
FIG. 4 is a cross-sectional view taken along line A-A in FIG. 3.
Figure 5:
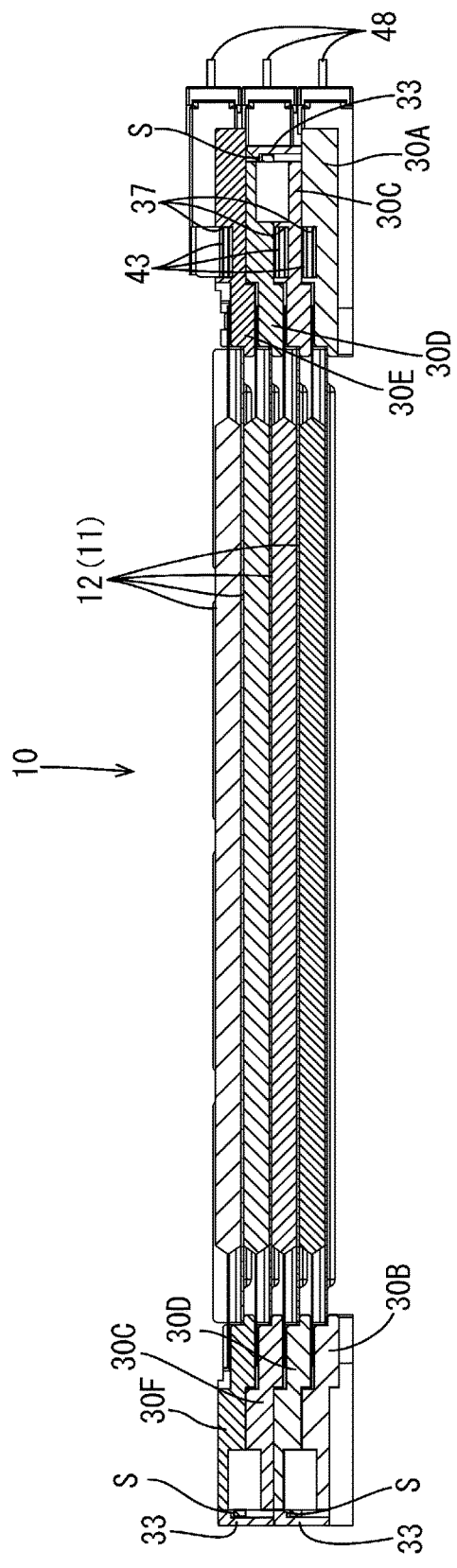
FIG. 5 is a cross-sectional view taken along line B-B in FIG. 3.

The four power storage units 21 that constitute the stacked object 20 are, from the bottom, a first power storage unit 21A, a second power storage unit 21B, a second power storage unit 21B, and a third power storage unit 21C in the stated order (see FIG. 4). Each of the power storage units 21 includes a heat transfer member 22 to which the holding members 30 are attached to both ends in its longitudinal direction, and a power storage element 12 that is placed on the heat transfer member 22 and held by the holding member 30.

Heat Transfer Member 22

The heat transfer member 22 is a member made of a heat conductive material. In the present embodiment, aluminum or an aluminum alloy, which has excellent heat conductivity, is used as the heat conductive material. As shown in FIG. 1, four heat conductive walls 23 that each arise upward are formed spaced apart from each other at a pair of side edges extending in the longitudinal direction of the heat transfer member 22. These heat conductive walls 23 are disposed in contact with an inner wall surface of a case when the stacked object 20 is accommodated in the case (not shown), and has a function of transmitting heat generated from the power storage element 12 to the case. The heat that is generated from the power storage element 12 travels to the case via the heat conductive walls 23, and is radiated to the outside of the case.

The holding members 30 made of an insulating resin material are attached to both ends in the longitudinal direction of the heat transfer member 22, and the power storage element 12 is placed on the upper surface of the heat transfer member 22.

Power Storage Element 12

Figure 3:
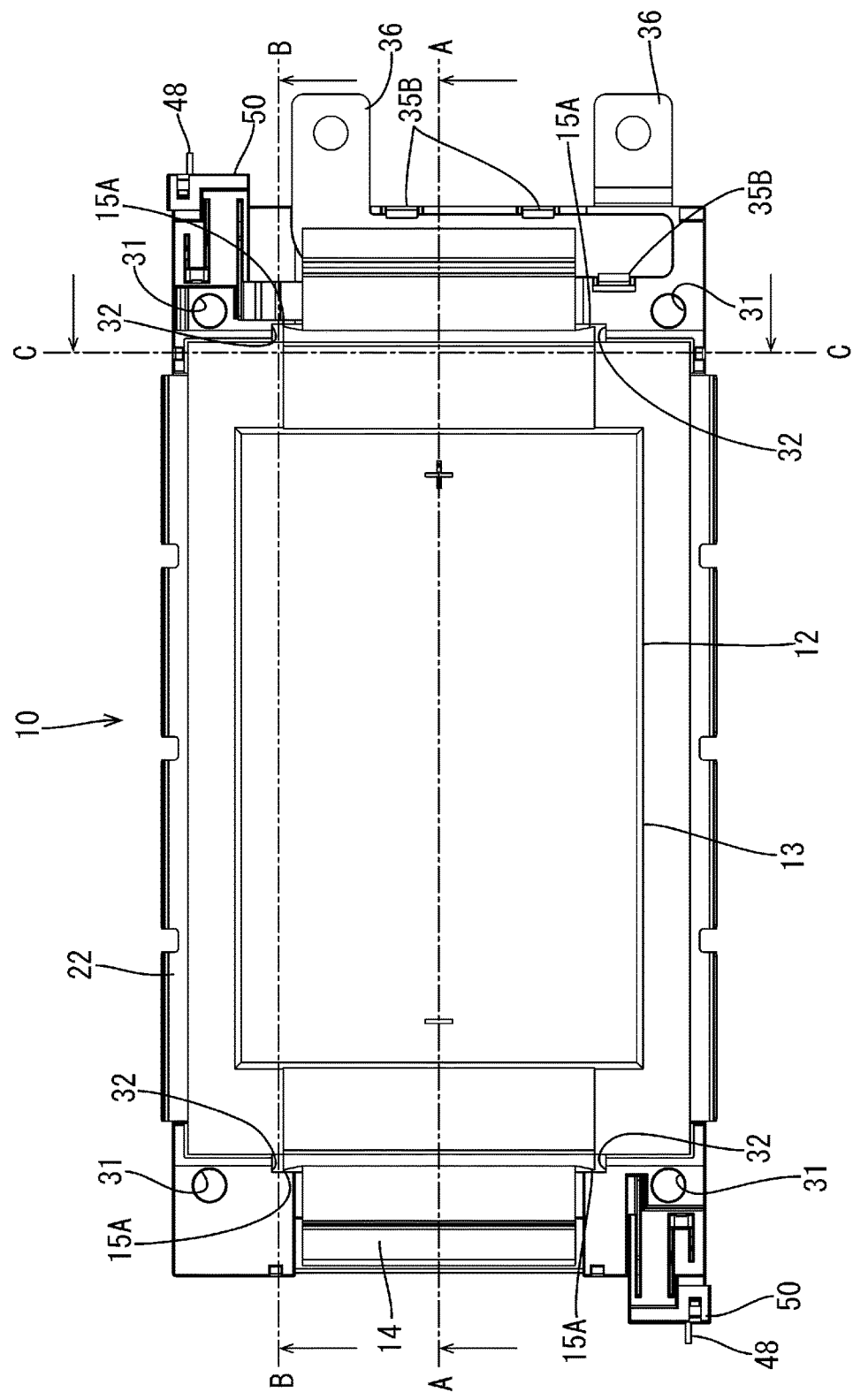
FIG. 3 is a plan view of the electricity storage module.

As shown in FIG. 3, the power storage element 12 has an approximately rectangular shape when viewed from the above. The power storage element 12 includes a container 13 obtained by welding side edges of a pair of laminate films each having an substantially rectangular shape, a power storage element (not shown) that is accommodated inside the container 13, and the lead terminals 14 that are connected to the power storage element inside the container 13 and drawn from the side edges of the container 13 to the outside. The polarity of the lead terminal 14 that is drawn from the edge on one side (side edge) of the container 13 is different from the polarity of the lead terminal 14 that is drawn from the edge on the other side.

As shown in FIG. 4, the power storage elements 12 that are placed on each other in the stacking direction are connected in series or in parallel to each other by disposing the lead terminals 14 of the power storage elements 12 over one another.

As shown in FIG. 4, in the present embodiment, the ends of the lead terminals 14 that are adjacent to each other in the stacking direction (the vertical direction in FIG. 4) are bent perpendicularly upward or perpendicularly downward, and are laid over each other.

In the present embodiment, the power storage elements 12 that are overlaid in the stacking direction are connected in series by electrically connecting the lead terminals 14 having opposite polarities. The lead terminals 14 that are adjacent to each other in the stacking direction can be connected by a known method such as welding, soldering, or brazing.

A metallic voltage detection bus bar 43 (an example of the detection terminal) for detecting voltage of the power storage element 12 is connected to the lead terminal 14 with a known method such as welding, soldering, or brazing.

Holding Member 30

The holding member 30 made of the insulating material is provided with two through holes 31 into which fixing members (not shown) are insertable. As shown in FIG. 3, a power storage element holding portion 32 is formed in each of the holding members 30, the power storage element holding portion 32 having a recessed shape into which a corner 15A of a wider region 15 of the lead terminal 14 is fitted. Movement of the lead terminal 14 (the power storage element 12) is restricted by this power storage element holding unit 32.

In the present embodiment, six types of holding members 30 are used. A holding member 30 located on the right side shown in FIG. 9 of the two holding members 30 that are part of the first power storage unit 21A in the first stage from the bottom is a first holding member 30A (see FIG. 11), and a holding member 30 located on the left side is a second holding member 30B (see FIG. 12).

Figure 13:
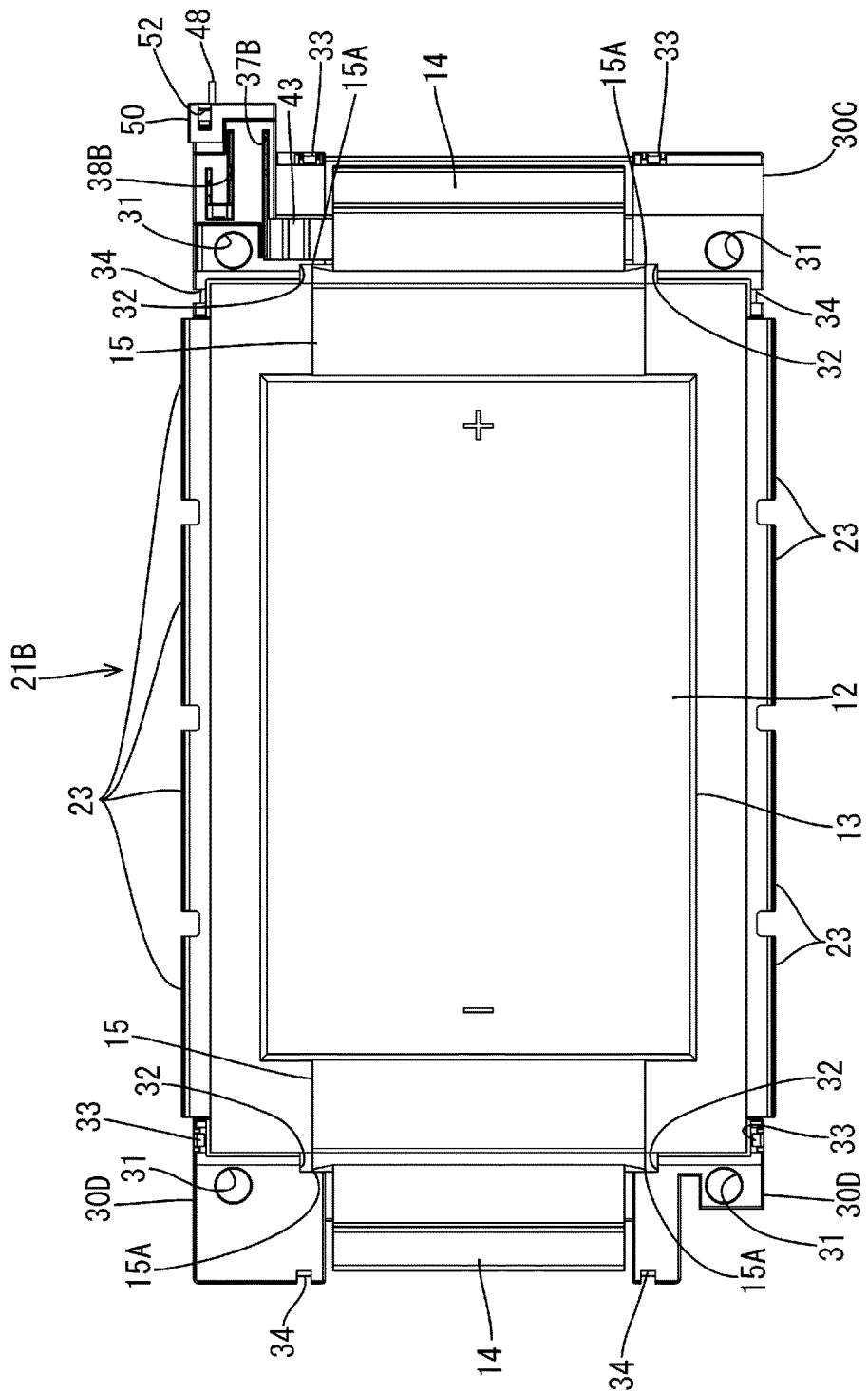
FIG. 13 is a plan view of a second power storage unit.
Figure 14:
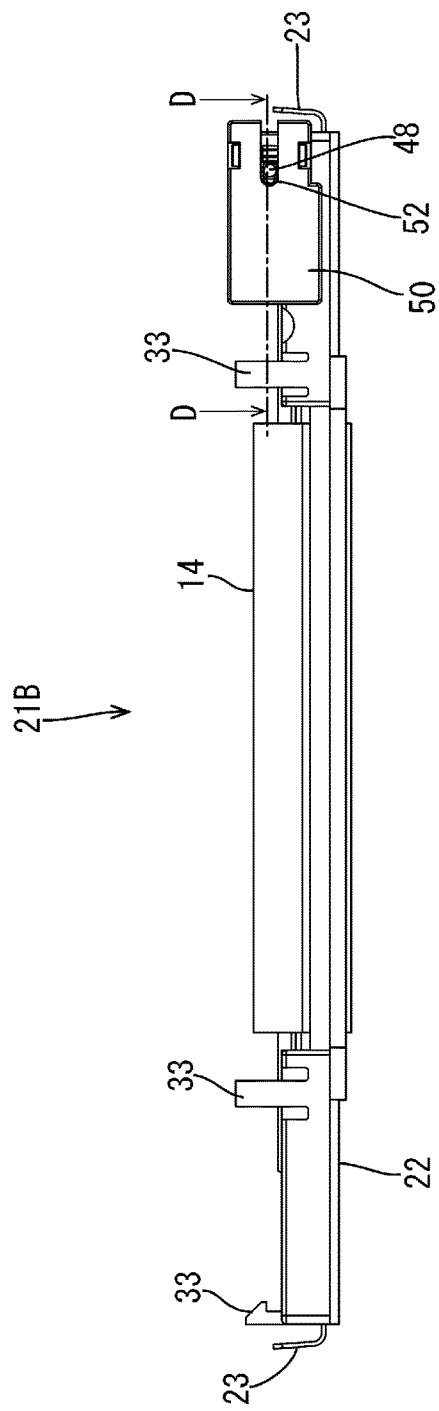
FIG. 14 is a right-side view of the second power storage unit.
Figure 17:
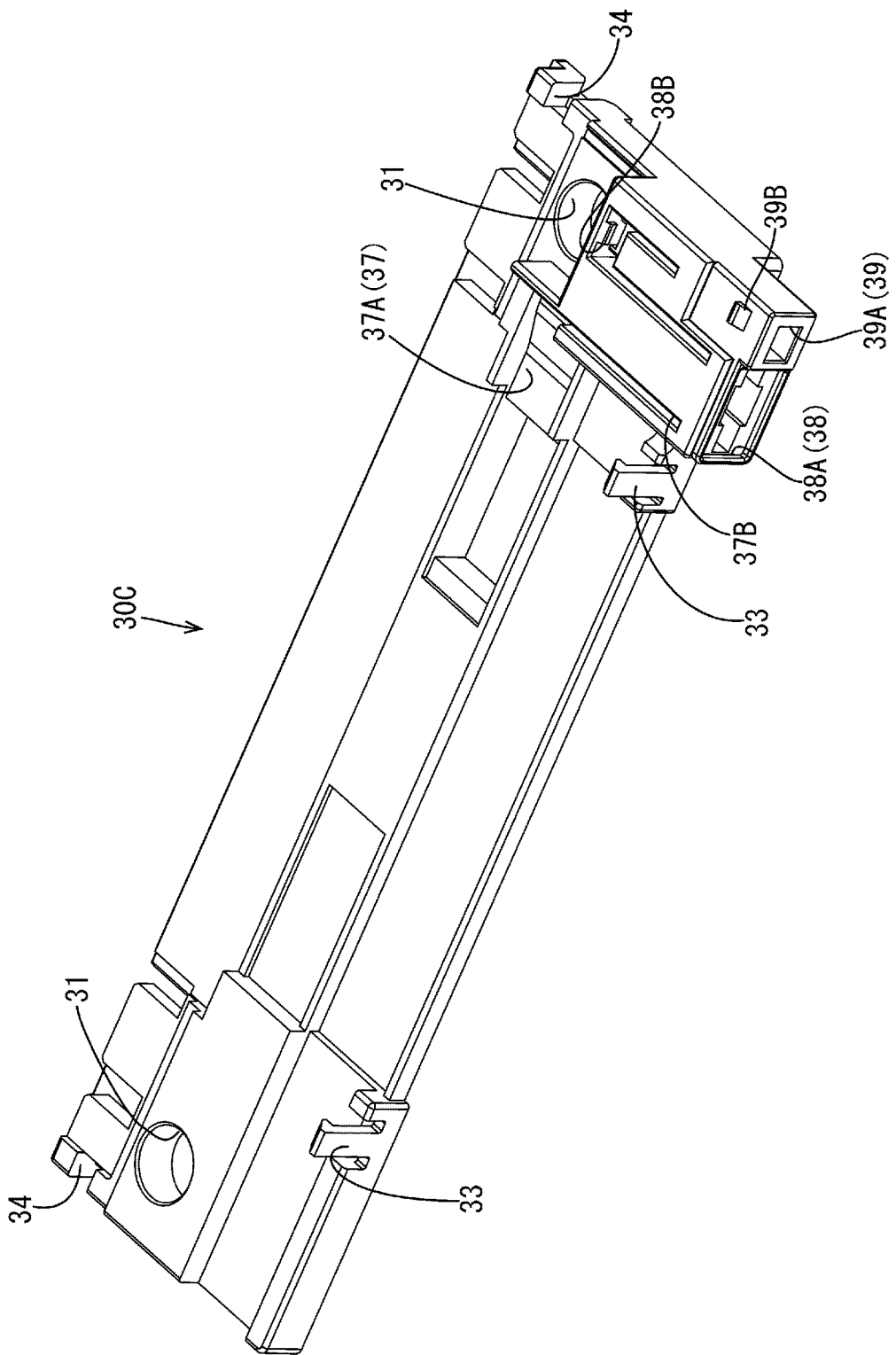
FIG. 17 is a perspective view of a third holding member.
Figure 18:
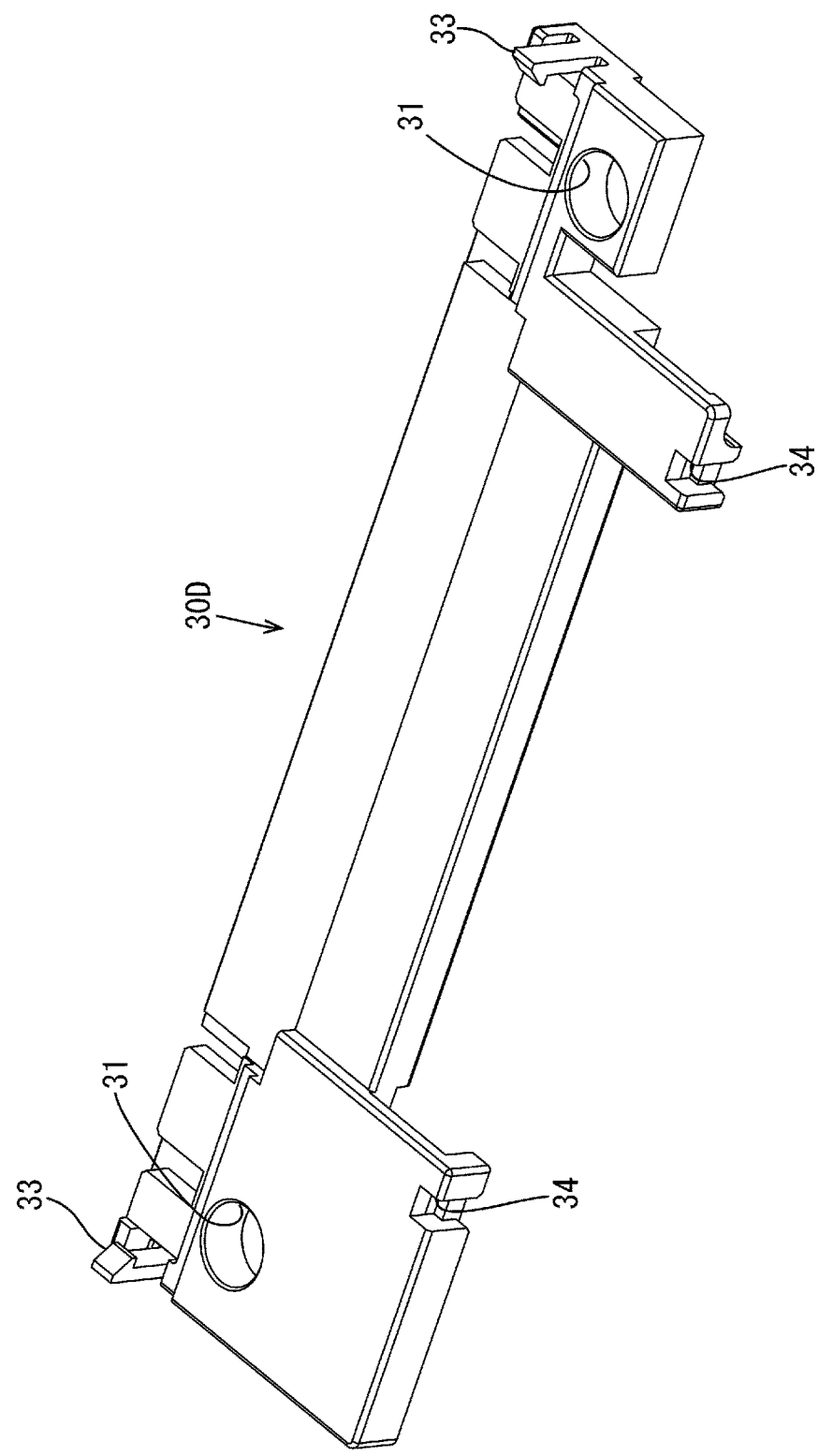
FIG. 18 is a perspective view of a fourth holding member.

A holding member 30 located on the right side shown in FIG. 13 of the two holding members 30 that are part of the second power storage units 21B in the second and third stages from the bottom is a third holding member 30C (see FIG. 17), and a holding member 30 located on the left side is a fourth holding member 30D (see FIG. 18).

The second power storage unit 21B in the third stage from the bottom is obtained by rotating the second power storage unit 21B in the second stage from the bottom by 180 degrees.

Figure 19:
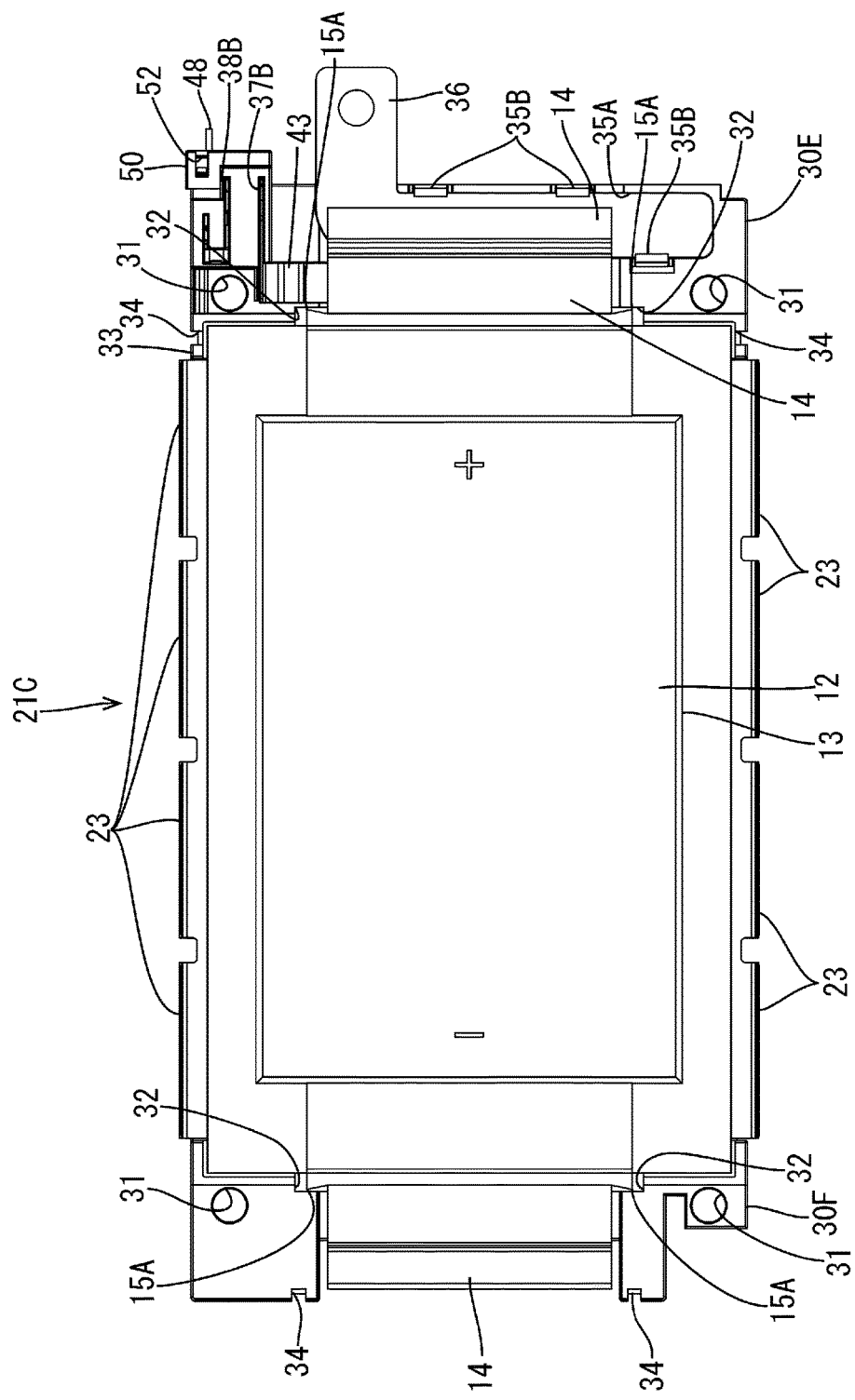
FIG. 19 is a plan view of a third power storage unit.
Figure 20:
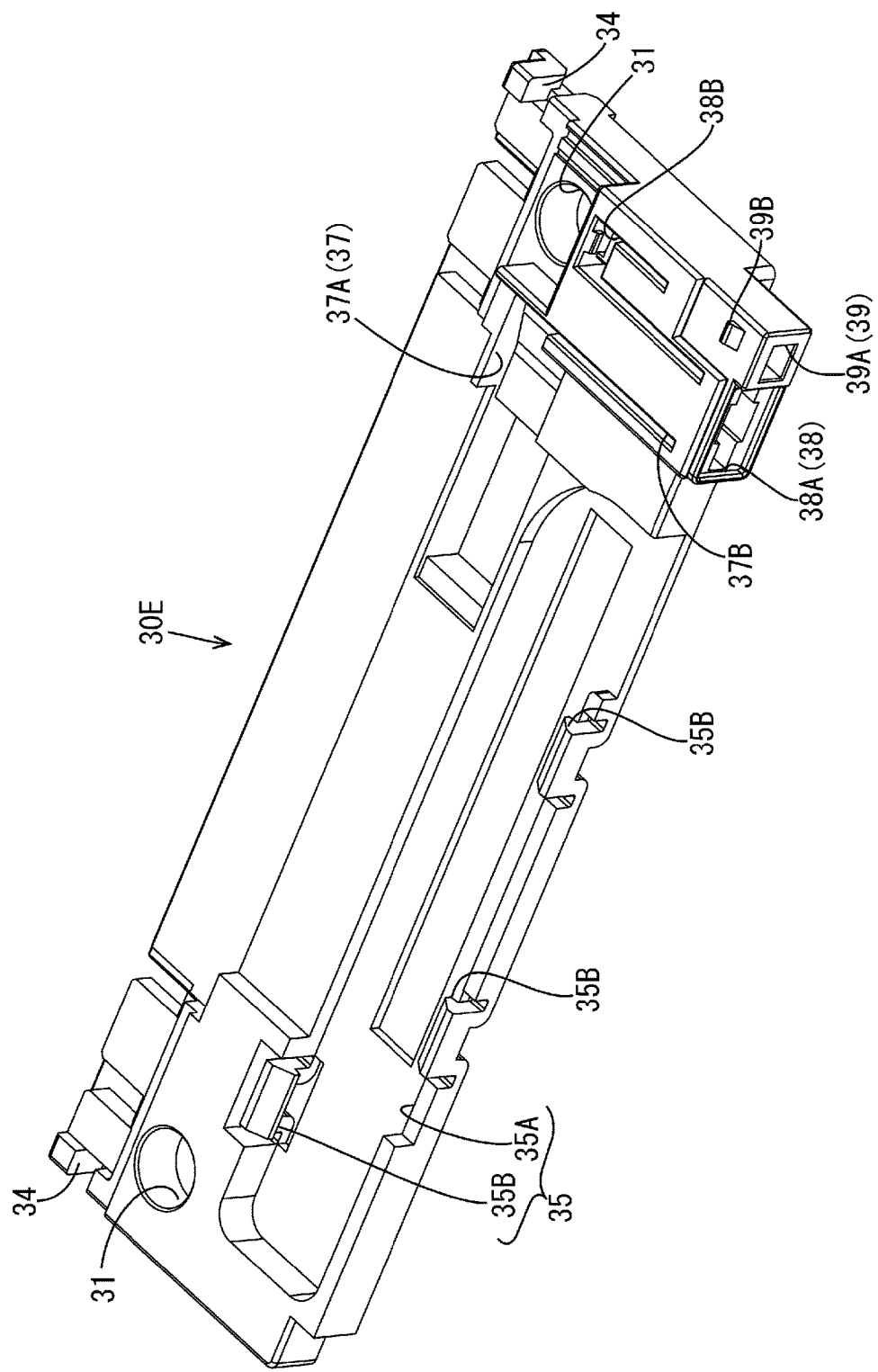
FIG. 20 is a perspective view of a fifth holding member.
Figure 21:
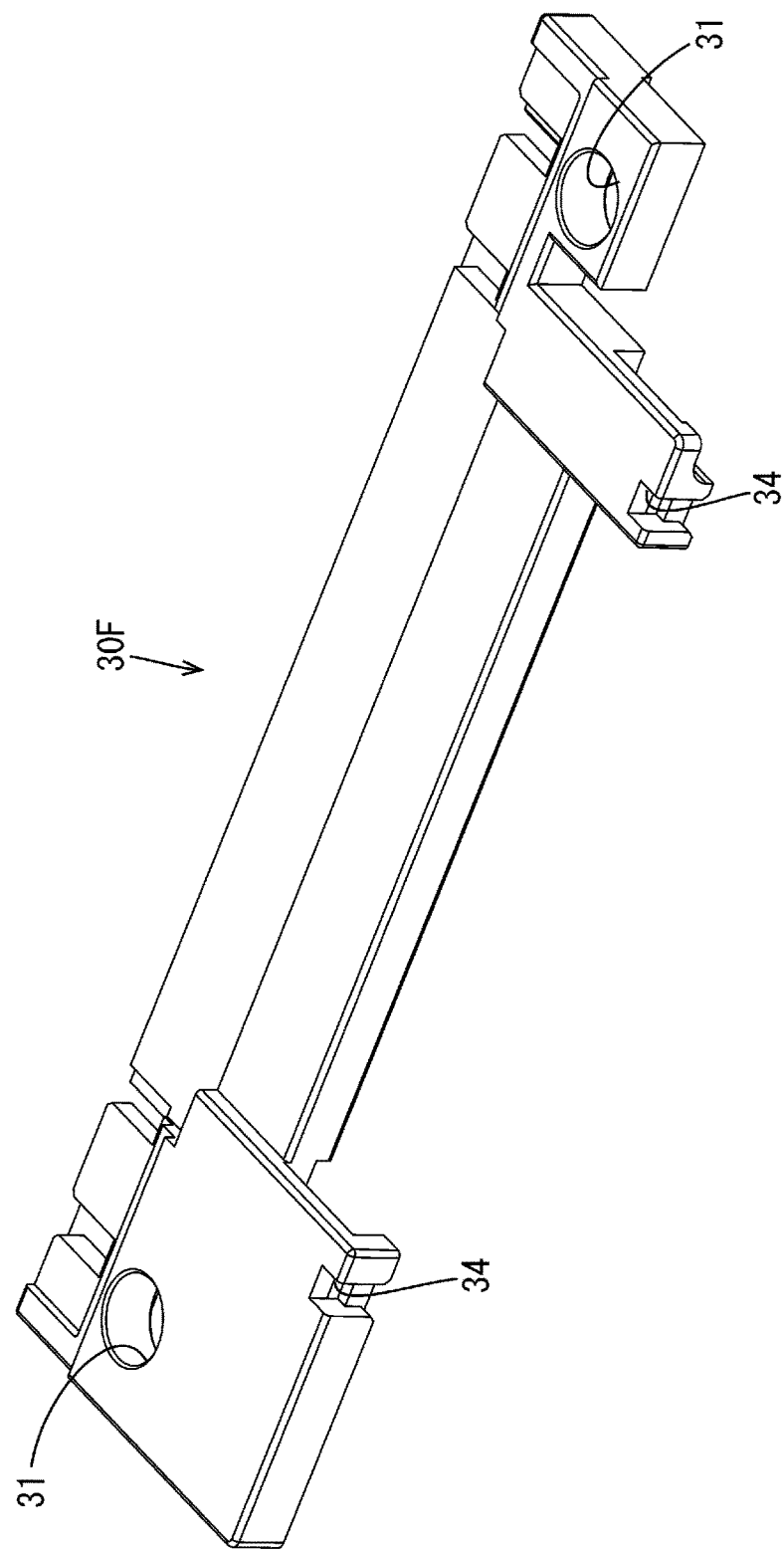
FIG. 21 is a perspective view of a sixth holding member.

A holding member 30 located on the right side shown in FIG. 19 of the two holding members 30 that are part of the third power storage unit 21C in the fourth stage (the uppermost stage) from the bottom is a fifth holding member 30E (see FIG. 20), and a holding member 30 located on the left side is a sixth holding member 30F (see FIG. 21).

Figure 6:
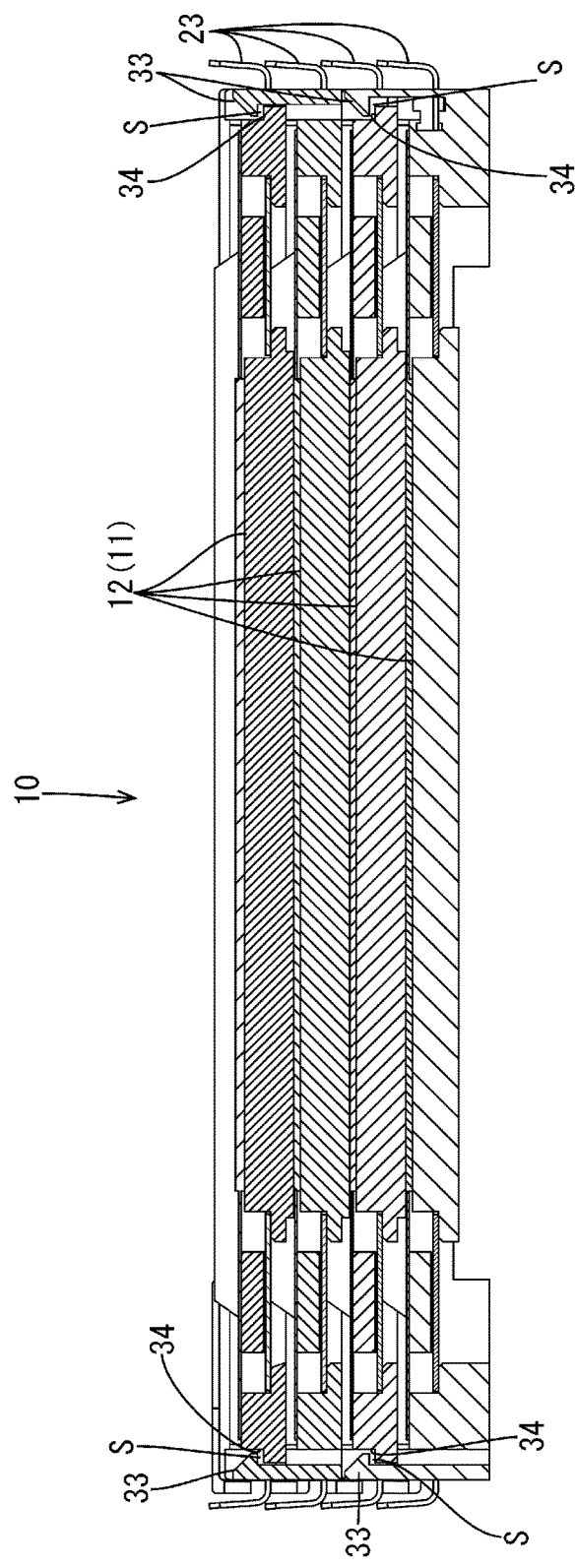
FIG. 6 is a cross-sectional view taken along line C-C in FIG. 3.

In the present embodiment, the holding members 30 that are adjacent in the direction in which the power storage elements 12 are stacked are locked movably in the direction in which the power storage elements 12 are stacked (see FIG. 6).

Figure 11:
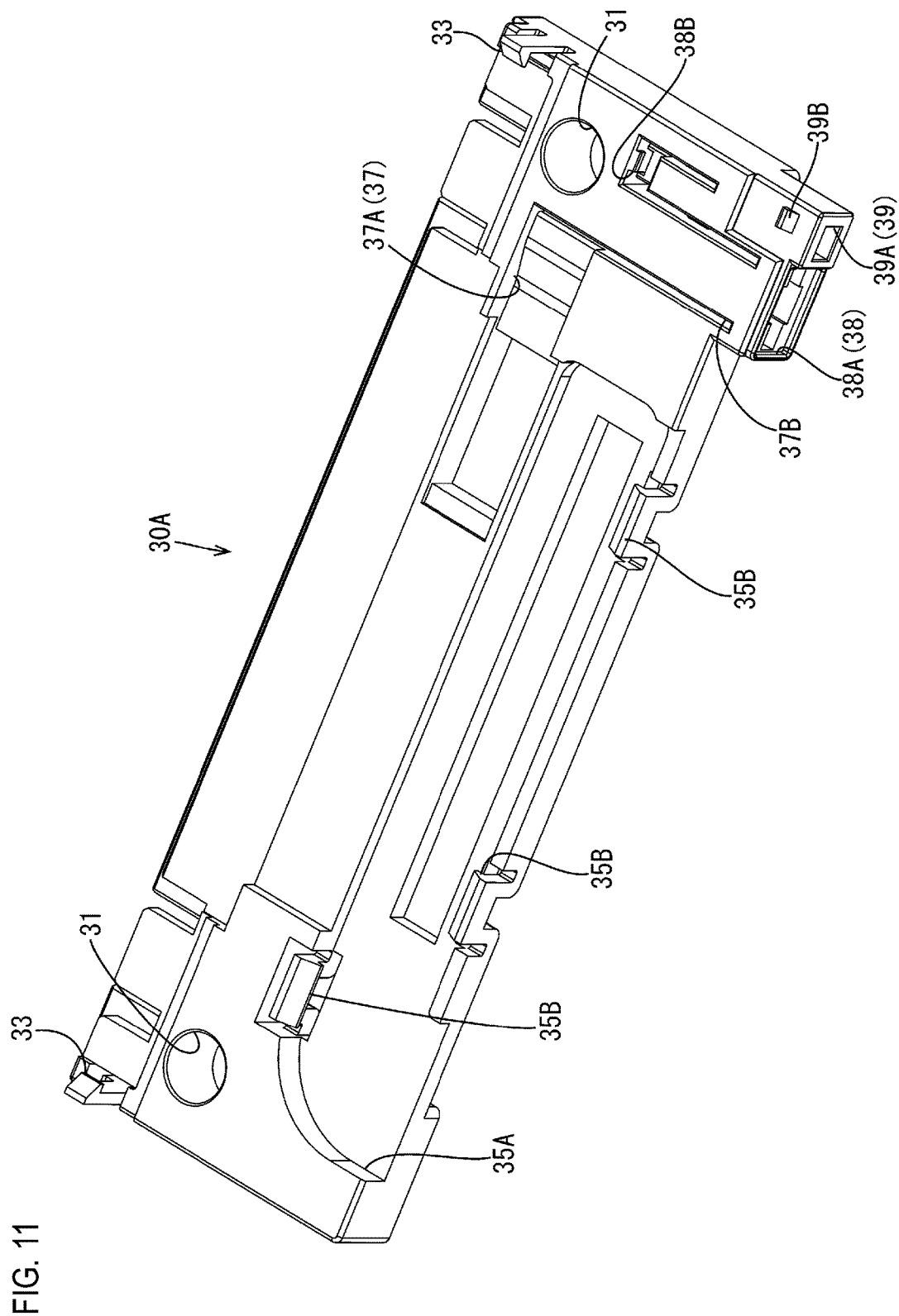
FIG. 11 is a perspective view of a first holding member.
Figure 12:
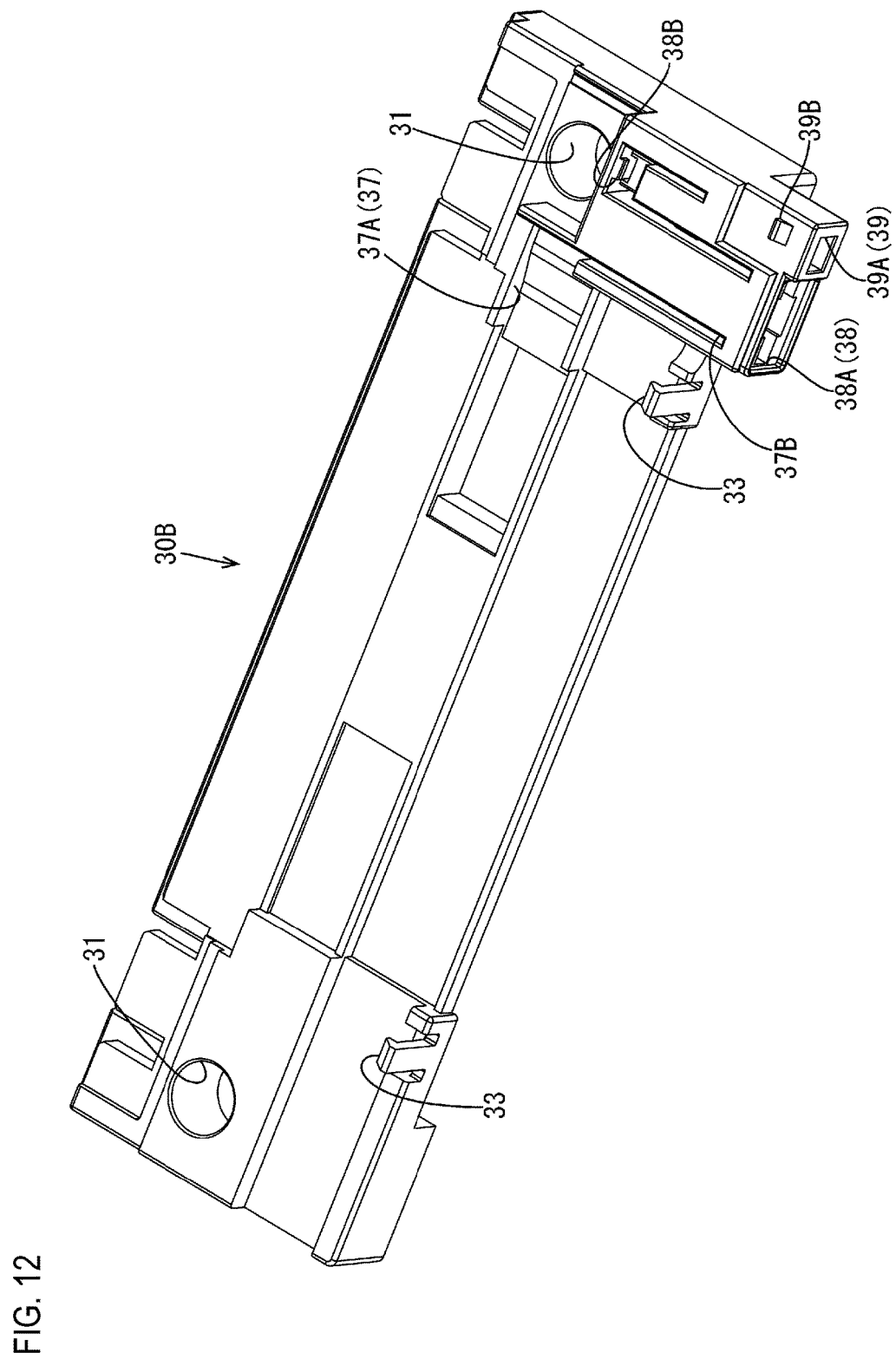
FIG. 12 is a perspective view of a second holding member.

Locking portions 33 that protrude upward are formed at left and right edges of the first holding member 30A in FIG. 11. A pair of locking portions 33 that protrude upward are formed at the edge on the front side of the second holding member 30B in FIG. 12.

Locking reception portions 34 for receiving the locking portions 33 of the holding member 30 (the first holding member 30A or the fourth holding member 30D) that is disposed below when stacked are provided at the left and right edges of the third holding member 30C in FIG. 17, and a pair of the locking portions 33 that protrude upward are formed at the edge on the front side of the third holding member 30C in FIG. 17.

A pair of locking reception portions 34 for receiving the locking portions 33 of the holding member 30 (the second holding member 30 or the third holding member 30C) that is disposed below when stacked are provided at the edge on the front side of the fourth holding member 30D in FIG. 18, and a pair of the locking portions 33 that protrude upward are formed at the left and right edges of the fourth holding member 30D in FIG. 18.

A pair of the locking reception portions 34 for receiving the locking portions 33 of the fourth holding member 30D that is disposed below when stacked are provided at the left and right edges in FIG. 20 of the fifth holding member 30E.

A pair of the locking reception portions 34 for receiving the locking portions 33 of the third holding member 30C that is disposed below when stacked are provided at the edge on the front side in FIG. 21 of the sixth holding member 30F.

The bus bar holding portions 35 for holding an external connection bus bar 36 that is to be connected to an external device are provided in the first holding member 30A and the fifth holding member 30E. The bus bar holding unit 35 includes a recess 35A into which the external connection bus bar 36 is fitted, and a retaining protrusion 35B for retaining the external connection bus bar 36 that is fitted to the recess 35A.

The external connection bus bar 36 is made of a metal material such as copper, a copper alloy, aluminum, or an aluminum alloy, and is overlaid on the lead terminal 14. An end of the external connection bus bar 36 protrudes frontward, and the end is provided with a connection hole 36A that is to be connected to an external connection terminal (not shown).

The first holding member 30A, the second holding member 30B, the third holding member 30C, and the fifth holding member 30E are respectively provided with detection terminal holding portions 37 that hold the voltage detection bus bars 43, fuse mounting portions 38 on which the fuses 40 connected to the voltage detection bus bars 43 are mounted, and terminal accommodation portions 39 for accommodating relay terminals 45 connected to the fuses 40 and female terminals 47 that are electrically connected to the relay terminals 45.

Figure 16:
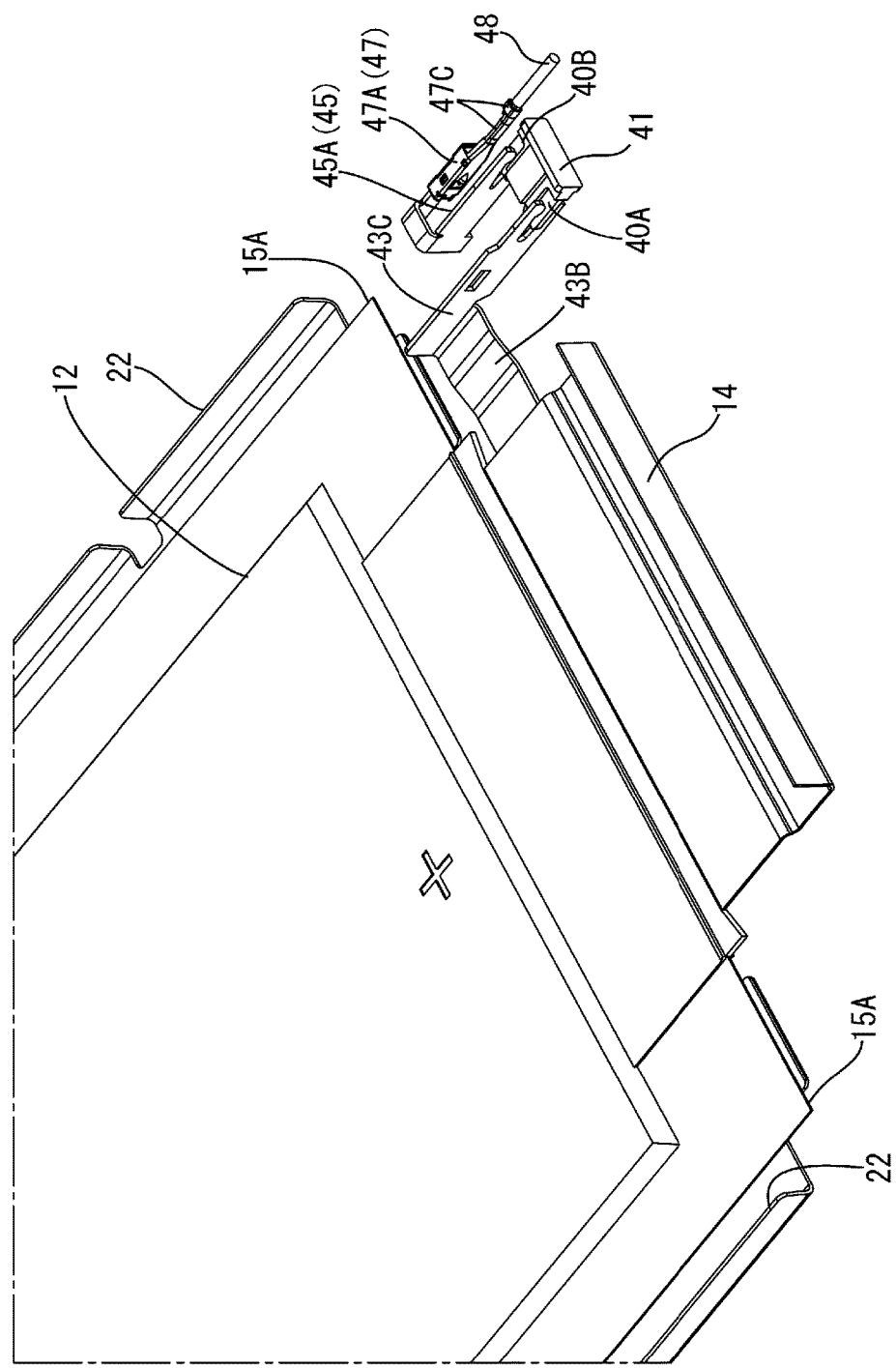
FIG. 16 is a partial perspective view of the second power storage unit.

As shown in FIG. 16, the voltage detection bus bar 43 held by the detection terminal holding portion 37 includes a terminal connection portion 43A that is overlaid on the lead terminal 14, an extension portion 43B that extends laterally from the terminal connection portion 43A, and a tuning fork-shaped terminal portion 43C formed by being bent perpendicularly upward to the extension portion 43B and branched in two at its end. The voltage detection bus bar 43 is made of a metal material such as copper, a copper alloy, aluminum, or an aluminum alloy, for example. The fuse 40 is held by the tuning fork-shaped terminal portion 43C and electrically connected.

The detection terminal holding portion 37 has a recess 37A into which the terminal connection portion 43A and the extension portion 43B of the voltage detection bus bar 43 are fitted, and a first terminal insertion portion 37B formed in the fuse mounting portion 38.

The fuse mounting portion 38 and the terminal accommodation portion 39 are integrally provided, and as shown in FIGS. 11, 12, 17, and 20, have a box shape.

The fuse mounting portion 38 has an opening into which the fuse 40 is insertable from the front side in FIG. 11. An opening 38A of the fuse mounting portion 38 is closed by inserting the fuse 40 and then attaching the fuse cover 50 (see FIGS. 1 and 2).

Figure 15:
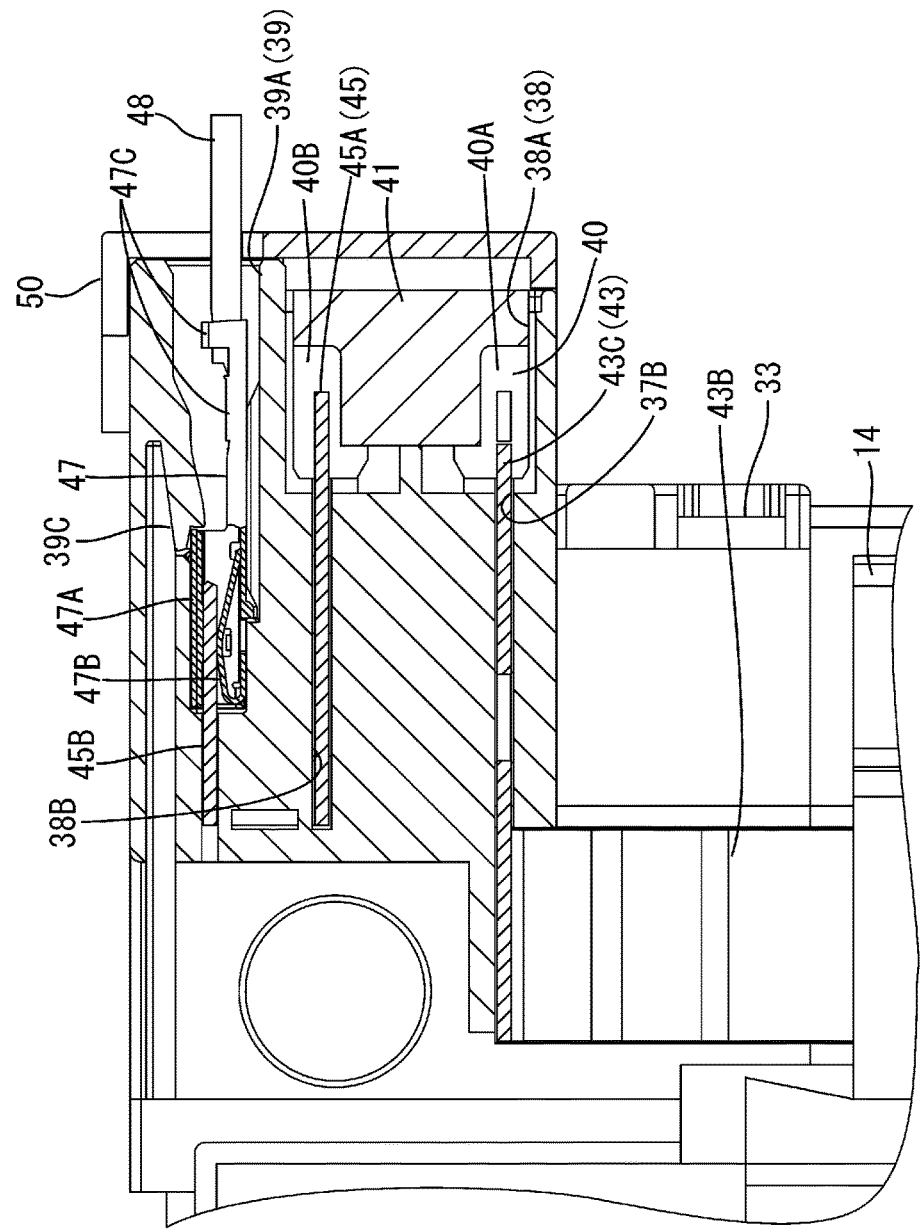
FIG. 15 is a cross-sectional view taken along line D-D in FIG. 14.

As shown in FIG. 15, an inner wall of the fuse mounting portion 38 has a shape extending along the shape of the fuse 40. An upper wall of the fuse mounting portion 38 is provided with the first terminal insertion portion 37B into which the tuning fork-shaped terminal portion 43C of the voltage detection bus bar 43 is inserted, and a second terminal insertion portion 38B into which the tuning fork-shaped terminal portion 45A of the relay terminal 45 is inserted. The second terminal insertion portion 38B has a C shape when viewed from above, and is provided from the fuse mounting portion 38 to the terminal accommodation portion 39.

The fuse 40 includes a connection portion 40A that is held by the tuning fork-shaped terminal portion 43C of the voltage detection bus bar 43 and is electrically connected thereto, a connection portion 40B that is held by the tuning fork-shaped terminal portion 45A of the relay terminal 45 and is electrically connected thereto, and an insulating portion 41 made of an insulating resin that is provided to connect two connection portions 40A and 40B. The two connection portions 40A and 40B are connected to each other inside the insulating portion 41. The connection portions 40A and 40B are made of a metal material. If an overcurrent flows through the fuse 40, the overcurrent is interrupted by the fuse 40 blowing out.

The relay terminal 45 is made of a metal material such as copper, a copper alloy, aluminum, or an aluminum alloy, for example, and includes the tuning fork-shaped terminal portion 45A that is connected to the fuse 40, and a tab-shaped male terminal 45B that extends from the tuning fork-shaped terminal portion 45A and is disposed inside the terminal accommodation portion 39.

The terminal accommodation portion 39 has an opening on the front side in FIG. 11, and the male terminal 45B of the relay terminal 45 is disposed inside the terminal accommodation portion 39. A locking protrusion 39B for locking the fuse cover 50 protrudes from an upper wall on the front end side. As shown in FIG. 15, a lance 39C for locking a female terminal 47 that is electrically connected to the male terminal 45B is formed on the inner wall of the terminal accommodation portion 39.

The female terminal 47 is held in the terminal accommodation portion 39 in a retained state by being locked to the lance 39C formed on the inner wall of the terminal accommodation portion 39. The female terminal 47 is obtained by pressing a metal plate material to a predetermined shape.

The female terminal 47 is connected to an end of the electric wire 48. The female terminal 47 includes a tubular terminal connection portion 47A that is connected to the male terminal 45B of the relay terminal 45, at a position opposite to a portion connected to the electric wire 48. An elastic contact piece 47B that elastically comes into contact with the male terminal 45B is disposed inside the connection portion 47A. The fuse 40 and the female terminal 47 are electrically connected to each other via the relay terminal 45 due to the male terminal 45B and the elastic contacting piece 47B elastically coming into contact with each other. The electric wire 48 is connected to the female terminal 47 by crimping two sets of barrel portions 47C of the female terminal 47.

The opening 38A of the fuse mounting portion 38 and an opening 39A of the terminal accommodation portion 39 are covered by attaching the fuse cover 50. The fuse cover 50 has a locking hole 51 for locking the locking protrusion 39B of the terminal accommodation portion 39 and an electric wire arrangement hole 52 through which the electric wire 48 is disposed.

Method for Assembling Electricity Storage Module 10

Prepared are the heat transfer member 22 to which the first holding member 30A and the second holding member 30B are attached, two heat transfer members 22 to which the third holding members 30C and the fourth holding members 30D are attached, and the heat transfer member 22 to which the fifth holding member 30E and the sixth holding member 30F are attached.

The external connection bus bar 36 is attached to the bus bar holding portion 35, the voltage detection bus bar 43 is arranged to be held by the detection terminal holding portion 37, and the voltage detection bus bar 43 is inserted into the first terminal insertion portion 37B. The relay terminal 45 is inserted into the second terminal insertion portion 38B of the terminal accommodation portion 39.

Figure 9:
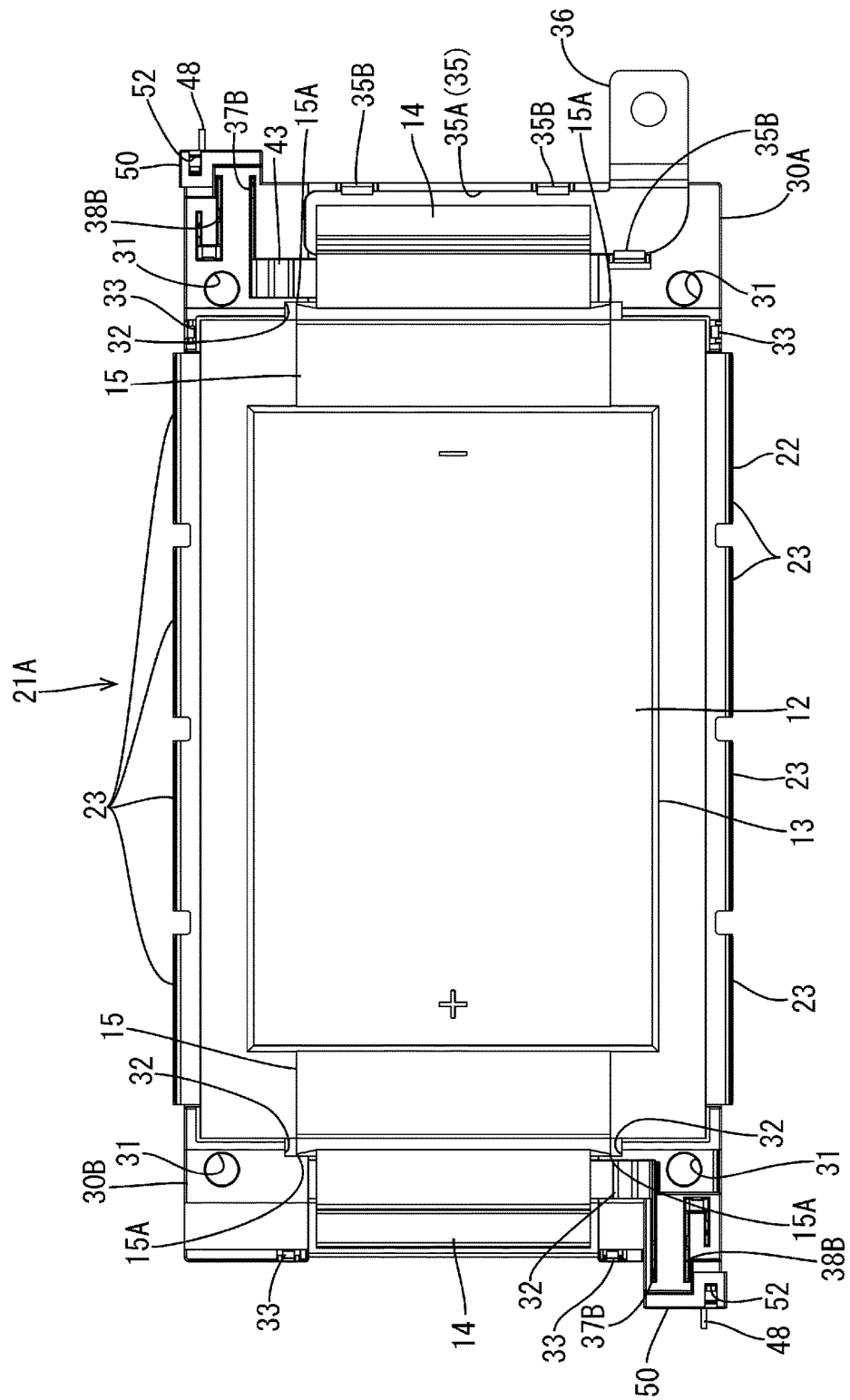
FIG. 9 is a plan view of a first power storage unit.
Figure 10:
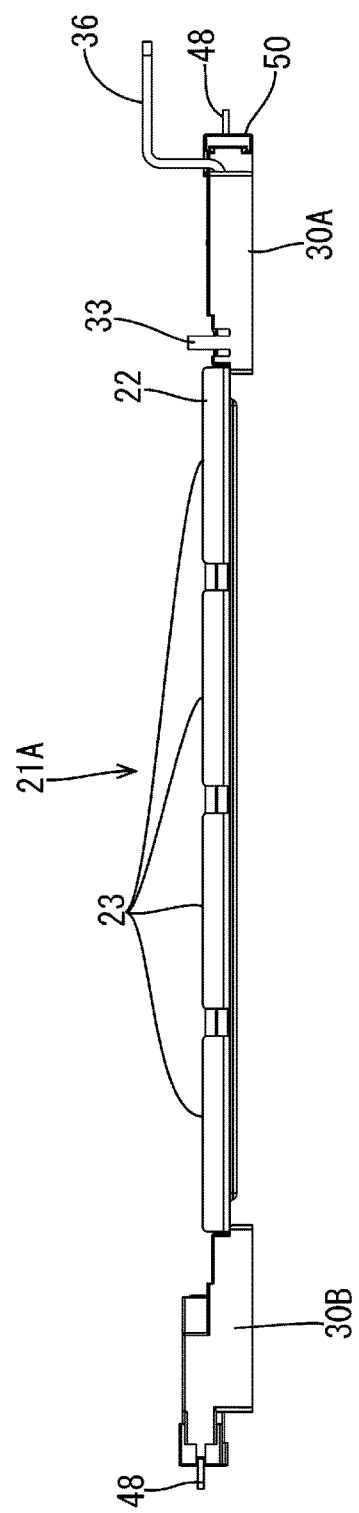
FIG. 10 is a front view of the first power storage unit.

Next, the power storage elements 12 are placed on the heat transfer members 22, and the power storage units 21 shown in FIGS. 9, 13, and 19 are produced by connecting the external connection bus bars 36 and the lead terminals 14, and connecting the voltage detection bus bars 43 and the lead terminals 14, with a method such as welding or the like.

Next, the fuse 40 is inserted into the fuse mounting portion 38. When the female terminal 47 is inserted into the fuse mounting portion 38 from the opening 39A of the terminal accommodation portion 39, the female terminal 47 is retained by being locked to the lance 39C, and the elastic contacting piece 47B of the connection portion 47A of the female terminal 47 and the male tab 45B elastically come into contact with each other (see FIG. 15).

Next, four power storage units 21 are stacked to produce the stacked object 20. Two second power storage units 21B are overlaid on the first power storage unit 21A, and the third power storage unit 21C is then overlaid thereon. At this time, locking portions 33 of holding members 30 that are adjacent in the stacking direction are locked to the locking reception portions 34.

In the present embodiment, as shown in FIG. 6, a gap S is formed between the locking portions 33 and the locking reception portions 34 of holding members 30 that are adjacent in the stacking direction, and thus the holding members 30 are movable in the direction in which the power storage elements 12 are stacked.

Figure 7:
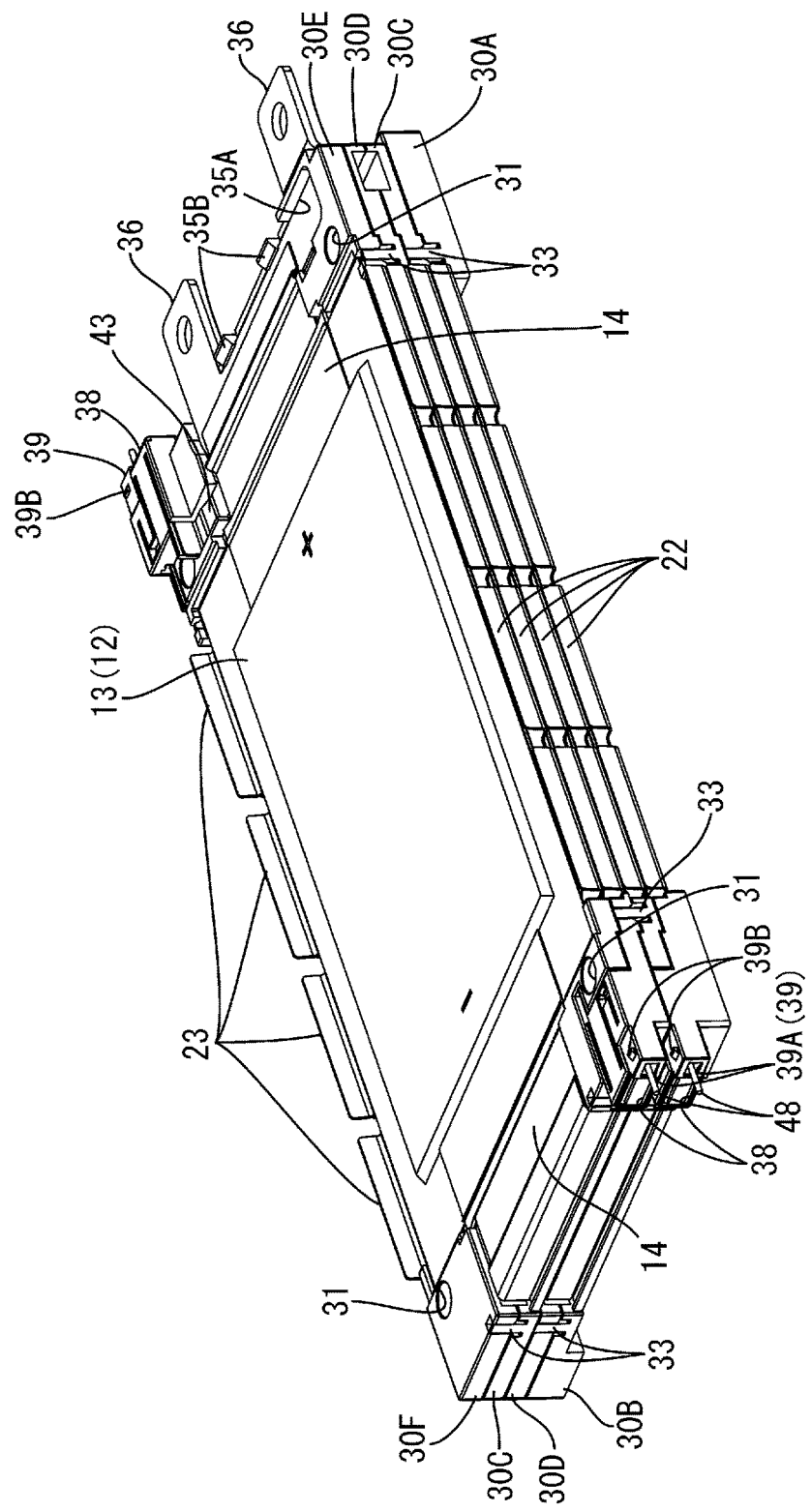
FIG. 7 is a perspective view of the electricity storage module shown from the front side, a fuse cover being removed from the electricity storage module.
Figure 8:
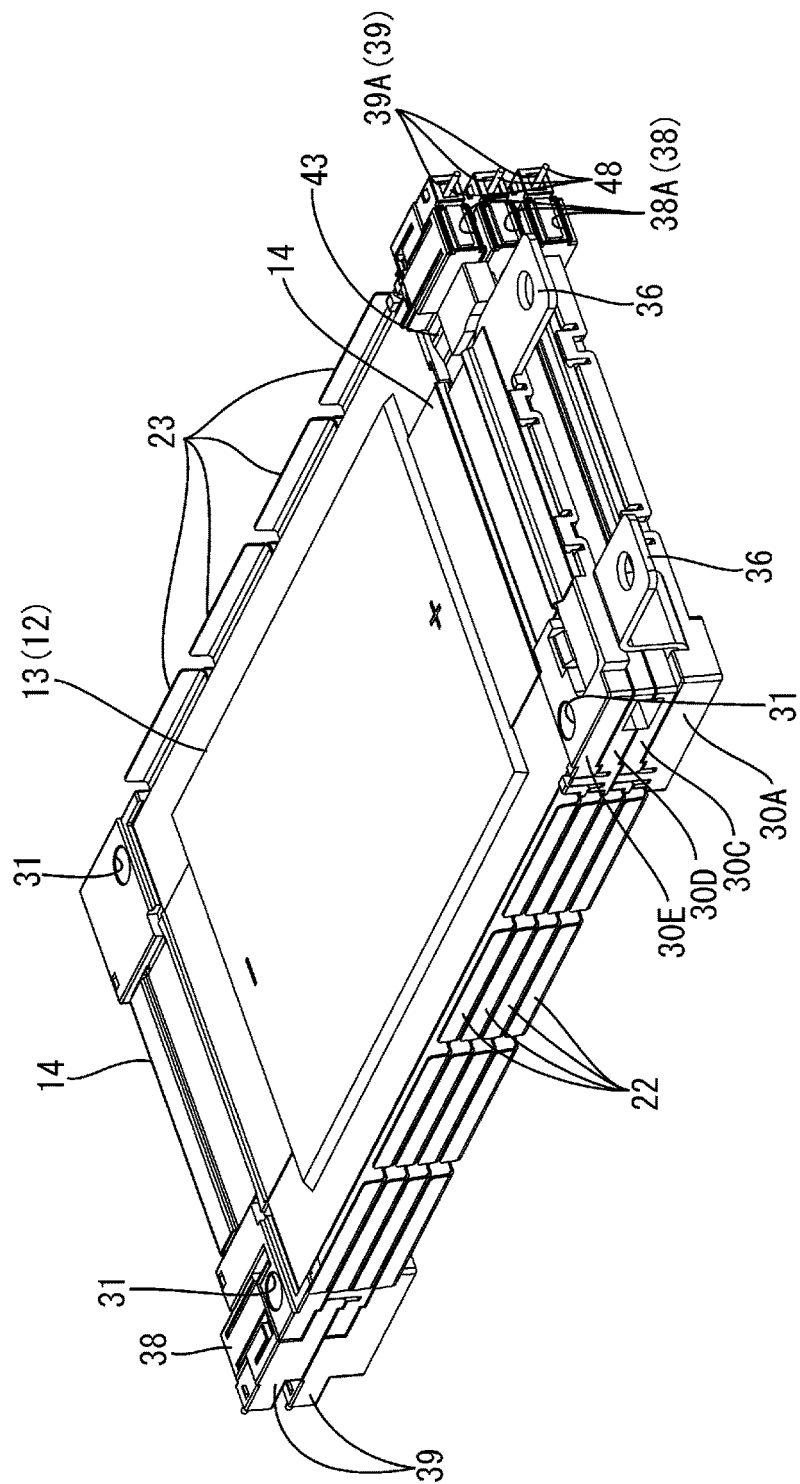
FIG. 8 is a perspective view of the electricity storage module shown from the rear side, the fuse cover being removed from the electricity storage module.

When the lead terminals 14 that are adjacent in the stacking direction are connected with a method such as welding after the power storage units 21 are stacked, the stacked object 20 as shown in FIGS. 7 and 8 can be obtained.

Next, when the fuse cover 50 is attached to cover the opening 38A of the fuse mounting portion 38 and the opening 39A of the terminal accommodation portion 39, the electricity storage module 10 as shown in FIGS. 1 to 3 can be obtained.

Functional Effects and Effects of Present Embodiment

Subsequently, the functional effects and effects of the present embodiment will be described.

In the present embodiment, since the holding member 30 for holding the power storage element 12 is provided with the fuse mounting portion 38, no other member for mounting the fuse 30 is required. As a result, according to the present disclosure, it is possible to provide a more compact electricity storage module 10.

Also, according to the present embodiment, since the holding members 30 that are adjacent in the direction in which the power storage elements 12 are stacked are locked movably in the direction in which the power storage elements 12 are stacked, tolerances in the direction in which the power storage elements 12 are stacked can be accommodated.

Furthermore, since the holding members 30 on the lower side in the direction in which the power storage elements 12 are stacked are locked to the locking portions 33 of the holding members 30 on the upper side, the power storage units 21A, 21B, and 23C can be efficiently stacked.

Also, according to the present embodiment, since the detection terminal holding portion 37 for holding the voltage detection bus bar 43 for detecting the state of the power storage element 12 is provided in the holding member 30, the voltage detection bus bar 43 can be held in the holding member 30 provided with the fuse mounting portion 38. Therefore, a reduction in size of electricity storage module can be reliably achieved.

Other Embodiments

The present disclosure is not limited to the embodiment described above using the foregoing description and drawings, and embodiments such as the following are also encompassed in the technical scope of the present disclosure.

(1) Although in the above-described embodiment, a configuration has been shown in which the holding members 30 that are adjacent in the direction in which the power storage elements 12 are stacked are locked movably in the direction in which the power storage elements 12 are stacked, the holding members that are adjacent in the stacking direction may not be locked to each other.

(2) Although the holding members 30 provided with the detection terminal holding portion 37 for holding the voltage detection bus bar 43 for detecting voltage of the power storage element 12 has been shown in the above-described embodiment, the holding member may not be provided with the detection terminal holding portion.

(3) Although the voltage detection bus bar 43 has been shown as the detection terminal in the above-described embodiment, the present disclosure is not limited to this. A temperature detection terminal for detecting temperature of the power storage element 12 may be used.

The invention claimed is:

1. An electricity storage module comprising:
a power storage element group obtained by stacking a plurality of power storage elements each having a lead terminal that protrudes from a side edge; and
holding members that are attached to the side edges at which the lead terminals are provided and that hold the power storage elements,
the holding members being provided with a fuse mounting portion for mounting a fuse that is to be electrically connected to the lead terminal, and
the holding members contacting either a top surface or a bottom surface of the lead terminals.

2. The electricity storage module according to claim 1, wherein
holding members that are adjacent in a direction in which the power storage elements are stacked are locked in the direction in which the power storage elements are stacked.

3. The electricity storage module according to claim 1, wherein
the holding members are provided with a detection terminal holding portion for holding a detection terminal for detecting a state of the power storage element.

4. The electricity storage module according to claim 1, wherein
the holding members are provided with a detection terminal holding portion for holding a detection terminal for detecting a state of the power storage element.

5. The electricity storage module according to claim 1, wherein
an opening of the fuse mounting portion in which the fuse is inserted faces away from an end of the lead terminal.

* * * * *